United States Patent [19]
O'Brien et al.

[11] Patent Number: 5,205,779
[45] Date of Patent: Apr. 27, 1993

[54] METHOD AND APPARATUS FOR AUTOMATICALLY SEGMENTING ANIMAL CARCASSES

[75] Inventors: William H. O'Brien, Amarillo, Tex.; James M. Malloy, Albany, Calif.

[73] Assignee: Texas Beef Group, Amarillo, Tex.

[21] Appl. No.: 888,256

[22] Filed: May 22, 1992

Related U.S. Application Data

[63] Continuation of Ser. No. 754,527, Sep. 4, 1991, abandoned.

[51] Int. Cl.⁵ ............................................. A22C 25/14
[52] U.S. Cl. ...................................... 452/157; 452/155
[58] Field of Search ................ 452/150, 155, 156, 157, 452/165

[56] References Cited

U.S. PATENT DOCUMENTS

| | | | |
|---|---|---|---|
| 3,527,083 | 9/1970 | Hensgen | 73/32 |
| 3,916,484 | 11/1975 | Kennedy | 17/52 |
| 4,209,878 | 7/1980 | Albert | 17/52 |
| 4,387,462 | 6/1983 | Markus | 372/32 |
| 4,389,749 | 6/1983 | Korhonen | 17/46 |
| 4,557,014 | 12/1985 | Vogt | 452/159 |
| 4,557,019 | 12/1985 | Van Devanter et al. | 452/157 |
| 4,628,569 | 12/1986 | Gagliardi, Jr. | 17/52 |
| 4,662,029 | 5/1987 | Helsene et al. | 17/52 |
| 4,688,296 | 8/1987 | Clarke et al. | 17/1 R |
| 4,847,954 | 7/1989 | Lapeyre et al. | 17/54 |
| 4,875,254 | 10/1989 | Rudy et al. | 452/157 |
| 4,962,568 | 10/1990 | Rudy et al. | 452/157 |

Primary Examiner—Bruce M. Kisliuk
Assistant Examiner—Jack Lavinder
Attorney, Agent, or Firm—Arnold, White & Durkee

[57] ABSTRACT

Manually segmenting animal carcasses into primary cuts involves an enormous amount of manual labor and attendant expense. However, known automated systems for segmenting carcasses cannot match the accuracy of expert butchers. The apparatus for segmenting animal carcasses disclosed herein provides an imaging station having a vision system that determines parameters of the interior and exterior of the carcass. Using these parameters, a computer determines a cutting path or a plurality of cutting paths for segmenting the carcass. A mounting vehicle, which securely holds the carcass, transports the carcass from the imaging station to a cutting station. In the cutting station, electrically controlled cutting implements, such as high-pressure water jets, segment the carcass along the determined cutting path or paths.

28 Claims, 8 Drawing Sheets

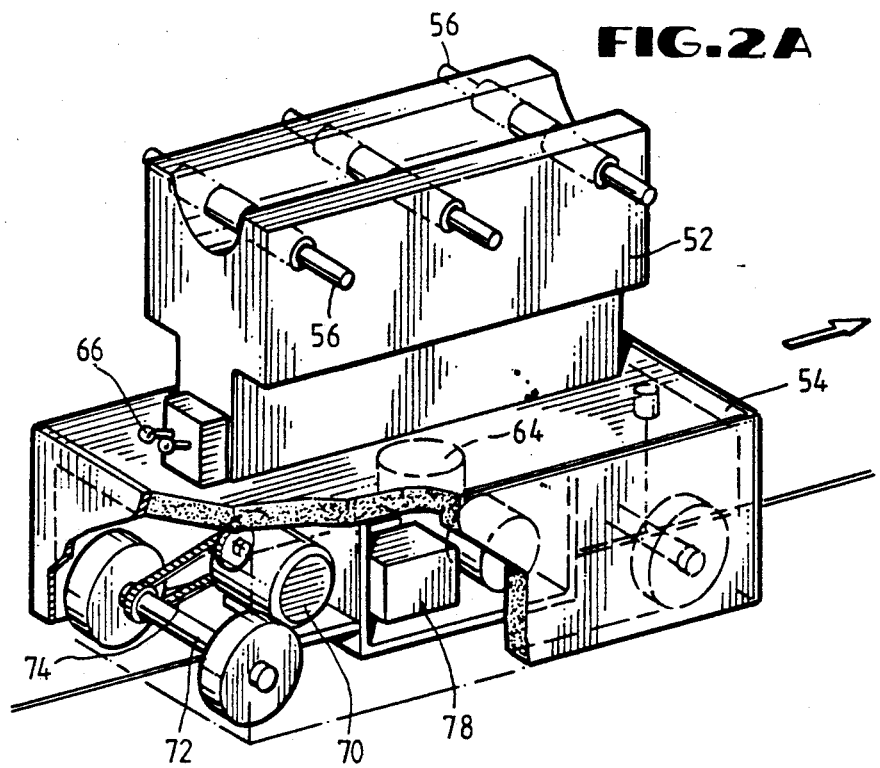
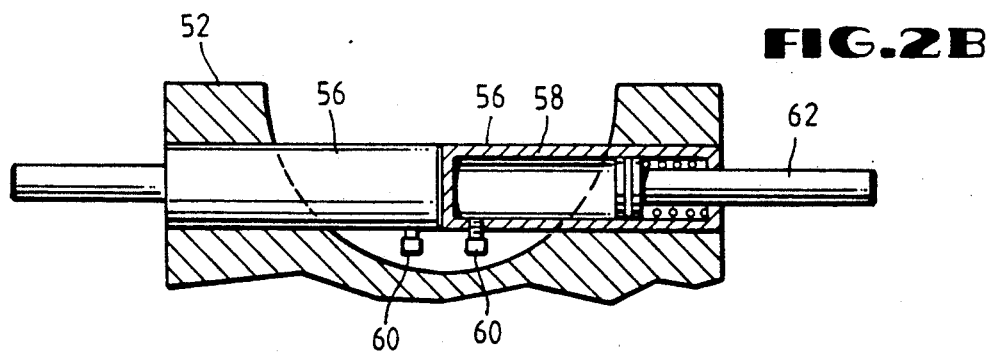
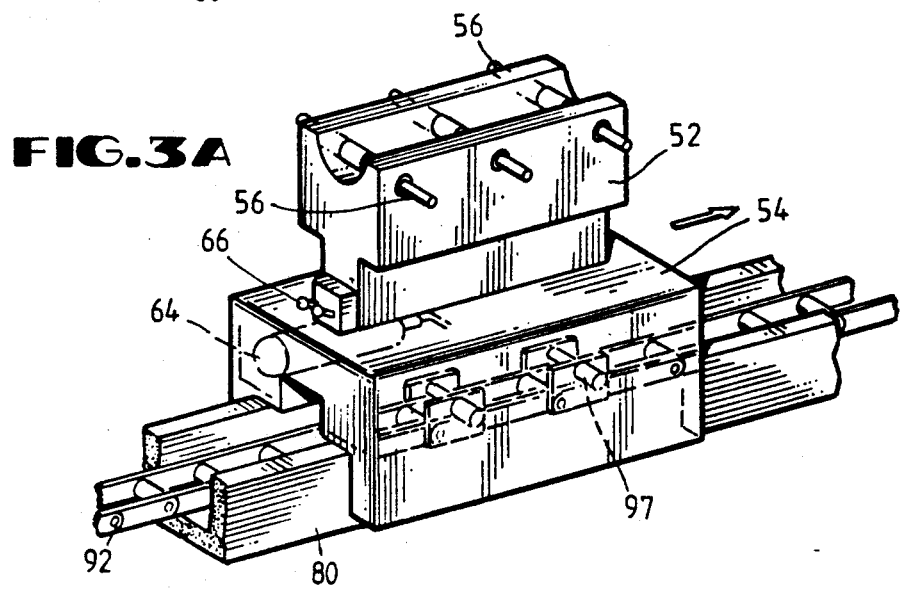

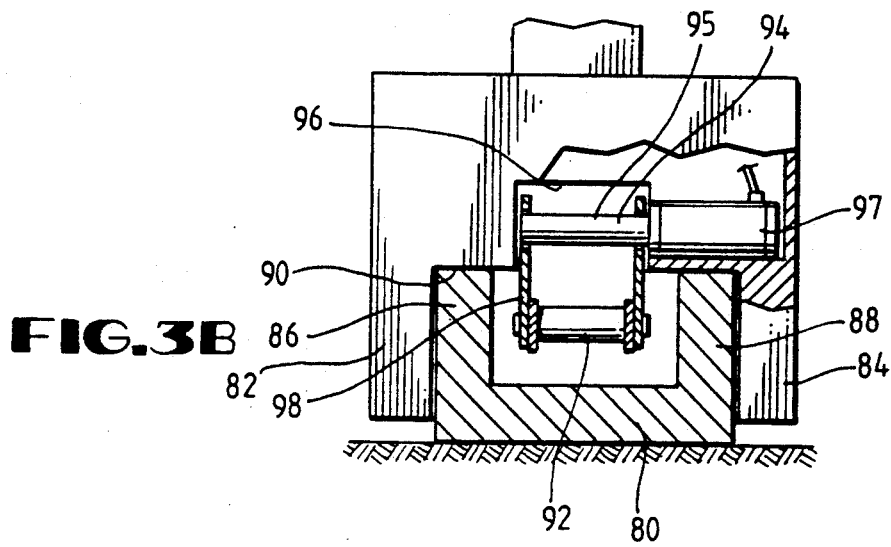
FIG. 3B
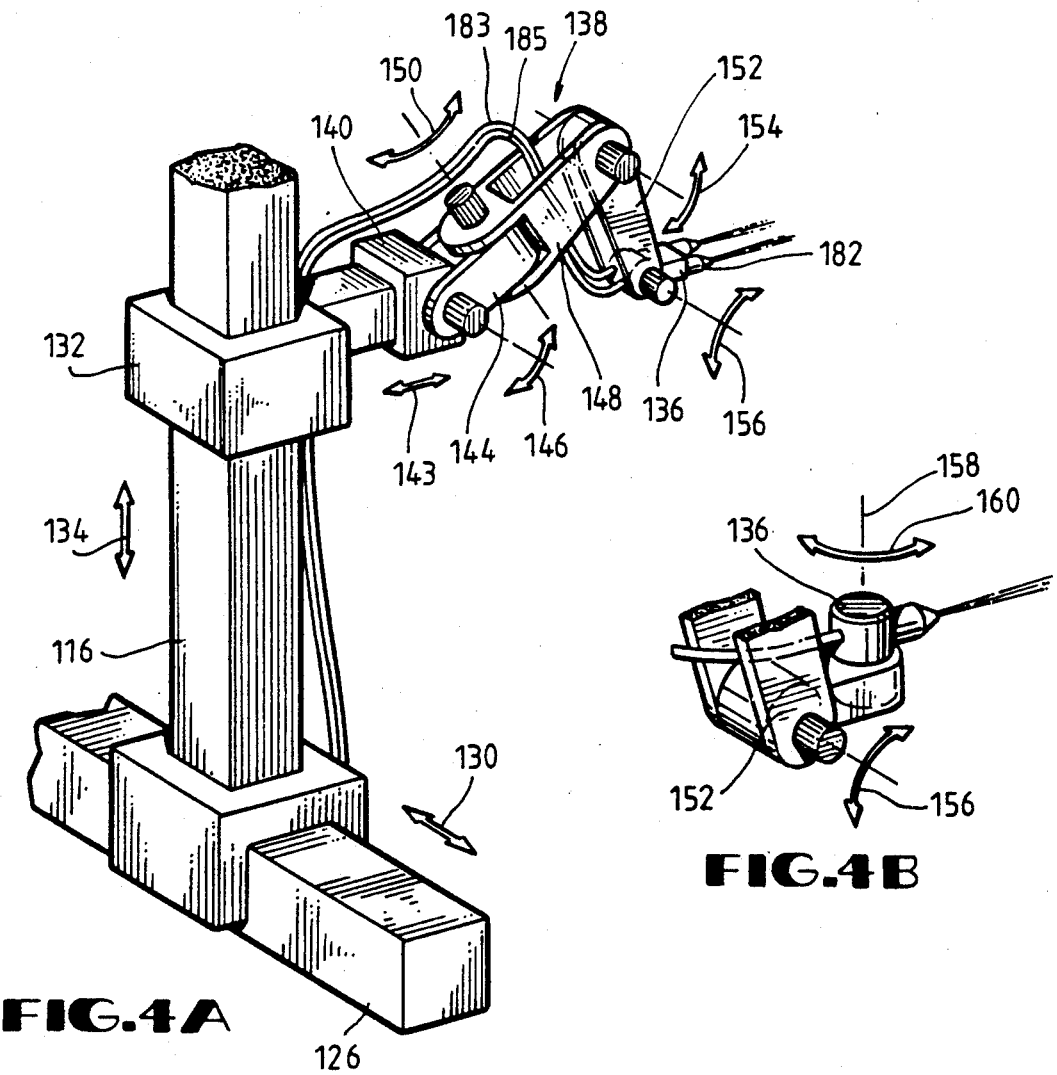
FIG. 4A
FIG. 4B

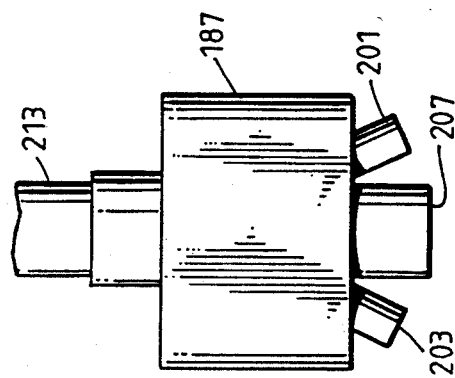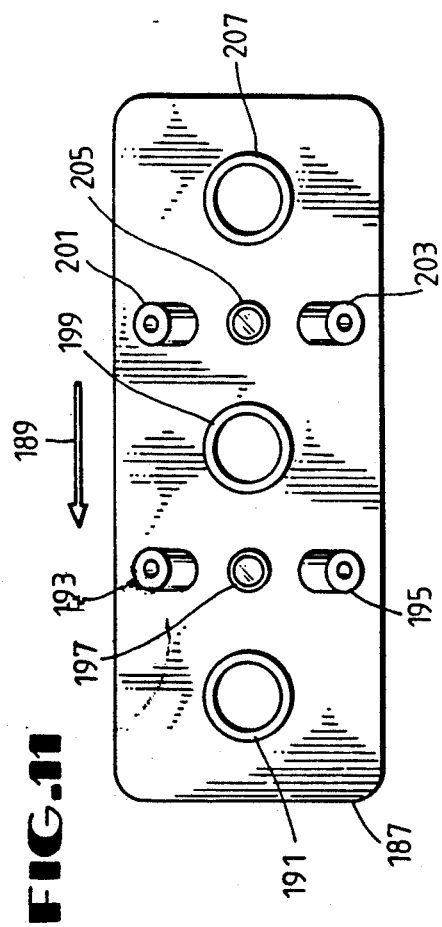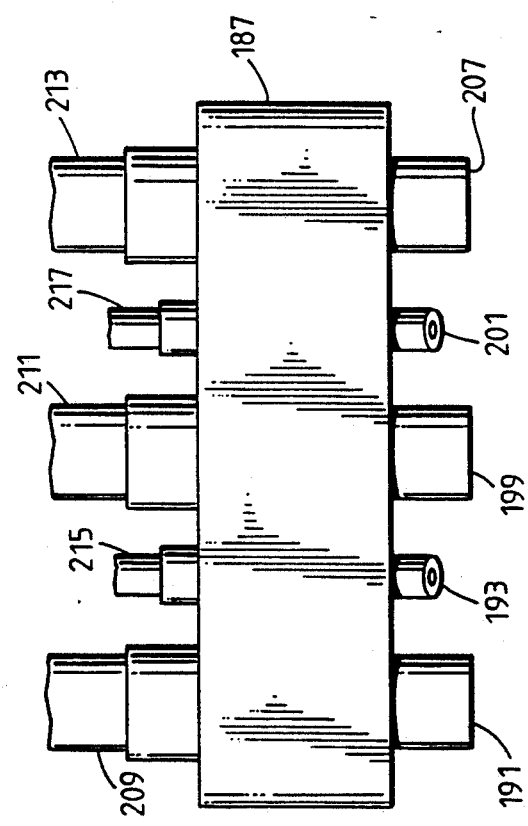

METHOD AND APPARATUS FOR AUTOMATICALLY SEGMENTING ANIMAL CARCASSES

This application is a continuation of application Ser. No. 754,527, filed Sep. 4, 1991 now abandoned.

BACKGROUND OF THE INVENTION

1. Field of the Invention

The present invention relates generally to meat processing and, more particularly, to an improved method and apparatus for cutting animal carcasses into smaller segments.

2. Description of the Related Art

It has been estimated that the beef processing industry suffers from over 10 billion dollars a year in efficiencies, with 3-4 billion dollars of that waste arising in the slaughter houses and packing plants. In a conventional packing house operation, animals are slaughtered, their hides are removed, and the resultant dressed carcass is hung in a storage cooler for subsequent cutting. During the cutting operation, the carcass is manually segmented by skilled workers into primary cuts. For instance, the primary cuts of beef are the shank, the round, the rump, the sirloin, the loin, the flank, the rib, the chuck, the plate, the brisket, and the shoulder. These primary cuts are then further cut and trimmed for sale to consumers. This primary cutting operation is time consuming and labor intensive, requiring a number of highly skilled butchers to manually segment each carcass.

On any particular day, the manner in which the primary cuts are made will vary depending upon the selling price that day for each primary cut. For example, the price of a loin or shoulder cut might vary a few cents per pound per day. When the price of a loin cut is high, the primary cut is positioned to maximize the weight of the loin. However, when the price of a shoulder cut is high, the primary cut is positioned to maximize the weight of the shoulder. Although the cuts made by the butchers are not consistently accurate to produce the most effective yield, because carcasses vary in size and build, and because primal cuts are not defined by any precise symmetry, no automated butchering system exhibits more accuracy than butchers.

Although automated butchering systems do not segment carcasses as accurately as their human counterparts, a packing house may, nonetheless, use automated butchering systems to prevent backlog and to streamline their operations. Different automated butchering systems require varying amounts of human interaction. For instance, several automated butchering systems have been developed wherein knives and other cutting implements, mechanically controlled by an operator, segment a carcass as it moves along a conveyor belt. Although cutting systems of this type have, to some extent, decreased the total man-hours required by skilled butchers, the greater accuracy achieved by the manual cut has been sacrificed. For example, an operator manually controlling an automated cutting blade is, by necessity, positioned at some distance from the carcass to be cut as the carcass moves between various cutting stations. Since a difference of only 1.25 inches in the position of a cut may have an appreciable effect upon the total value realized from the various primary cuts, the packing houses have been faced with balancing the profit lost due to inaccurate cuts against the profit gained due to greater efficiency.

In an effort to reduce operator intervention and to provide greater cutting accuracy, external vision systems, such as television cameras and photo sensors, have been employed to optically scan moving carcasses and to store in memory specific physical characteristics derived from the optical scanning procedure. The information stored in memory is used control automated cutting tools which make the primary cuts. For instance, in one automated carcass cutting system, a carcass is hung on an overhead conveyor and the primary cuts are marked by a skilled cut specialist. The marks for the various cuts designate both the cut direction and the angle of cut, and the markings are made in colors which radiate particular frequencies when scanned with a light-sensitive scanner. When a detector senses that the carcass is in the proper position, it triggers a video scanning camera to rapidly scan the complete carcass. The scanning camera is filtered by a red filter so that the red meat, white fat, and bone appear the same color. However, the markings on the carcass radiate different frequencies and, therefore, are sensed by the camera. The data retrieved from the video camera is stored in a memory and used to control motor driven knifes when the carcass moves from the scanning station to the cutting station.

While this system relieves butchers from the burden of manually cutting carcasses, it still requires skilled cutting specialists to mark each of the carcasses using a proper color code. Thus, the accuracy of the cut is limited by the accuracy of the color-coded markings on the surface of the carcass and by the limited maneuverability of motor driven knives. Moreover, motor driven knives require frequent replacement, especially when required to cut through bone as well as chilled or frozen fresh.

The present invention is directed to overcoming, or at least minimizing, one or more of the problems set forth above.

SUMMARY OF THE INVENTION

In accordance with one aspect of the present invention, there is provided an apparatus for segmenting an animal carcass. The apparatus includes an imaging station having a vision system therein. The vision system is arranged to scan at least a portion of the carcass and produces signals corresponding to an interior and exterior image of the scanned portion of the carcass. A computer, coupled to the vision system, receives the signals and processes the signals to determine a cutting path for segmenting the carcass. A cutting station, coupled to the computer, has at least one cutting implement which is controllably moveable along the cutting path to segment the carcass.

BRIEF DESCRIPTION OF THE DRAWINGS

The foregoing and other advantages of the invention will become apparent upon reading the following detailed description and upon reference to the drawings in which:

FIG. 2A is a perspective view of a mounting vehicle for holding and transporting an animal carcass in the apparatus illustrated in FIGS. 1A and 1B;

FIG. 2B is a cross-sectional view of a retractable hook that forms a portion of the mounting vehicle illustrated in FIG. 2A;

FIG. 3A is a perspective view of another embodiment of a mounting vehicle for holding and transporting an animal carcass in the apparatus illustrated in FIGS. 1A and 1B;

FIG. 3B is a cross-sectional view of a drive mechanism that forms a portion of the mounting vehicle illustrated in FIG. 3A;

FIG. 4A illustrates a multi-axis control arm and water/abrasive jet assembly for use in the cutting station of the apparatus illustrated in FIG. 1A;

FIG. 4B illustrates a single water or abrasive jet;

FIG. 11 is a bottom view of a cutting head having nozzles for water jets, abrasive jets, and air jets;

FIG. 12 is an end view of the cutting head of FIG. 11; and

FIG. 13 is a side view of the cutting head of FIG. 11.

Figure 1A:
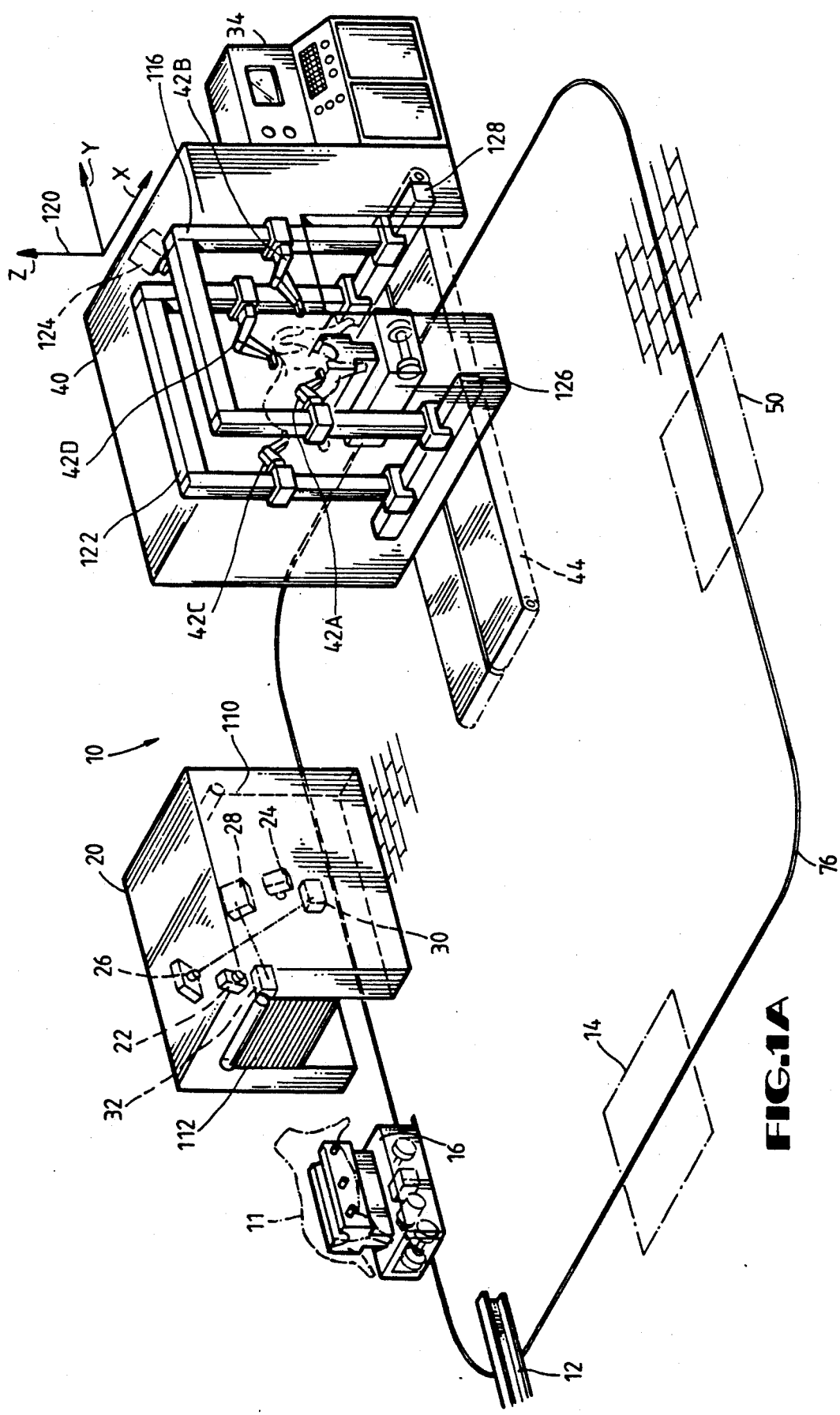
FIG. 1A is a perspective view of an apparatus for segmenting animal carcasses in accordance with the present invention.

While the invention is adaptable to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the appended claims.

DESCRIPTION OF THE PREFERRED EMBODIMENTS

Turning now to the drawings and referring initially to FIG. 1A, an apparatus for automatically segmenting animal carcasses is illustrated and generally designated by a reference numeral 10. Although the following description of the operation of the apparatus 10 will assume that the apparatus 10 is segmenting a cattle carcass 11, the apparatus 10 is also useful for processing other types of animals, such as pigs and lambs. Once an animal has been killed, the animal is preferably hung on an overhead rail conveyor, and its hide and entrails are removed. After the animal has been stripped and eviscerated, the carcass is typically chilled or frozen to minimize fluid loss during subsequent processing. After chilling, the rail conveyor 12 delivers the carcass 11 of the animal to a mounting station 14.

At the mounting station 14, a laborer removes the animal carcass from the overhead conveyor 12 and places the animal carcass on a mounting vehicle 16. The mounting vehicle 16, which forms a portion of a carcass transport system, securely holds the carcass 11 and transports the carcass 11 from one station to another in the apparatus 10. The mounting vehicle 16 and the carcass transport system are described in greater detail with reference to FIGS. 3A, 3B, 4A and 4B.

After the carcass 11 is loaded onto the mounting vehicle 16, the mounting vehicle 16 transports the carcass 11 to an imaging station 20. In the imaging station 20, a first scanner scans exterior portions of the carcass 11, and a second scanner scans interior portions of the carcass 11. Preferably, the first scanner includes two television cameras 22 and 24, and the second scanner includes two X-ray tubes 26 and 28 with their respective image intensifiers 30 and 32. A computer 34 uses the information obtained from this scanning to create cutting paths for segmenting the carcass 11. As will be discussed subsequently, an expert system running on the computer 34 preferably determines the optimum cutting paths based not only on the information obtained from the scanning, but also based on information stored in the expert system's database.

After the scanning, the mounting vehicle 16 transports the carcass 11 to a cutting station 40 where cutting implements 42 cut the carcass 11 along the created cutting paths. Preferably, the cutting paths are computed so that the cutting implements 42 cut the carcass 11 into primary cuts, such as the shank, the round, the rump, the sirloin, the loin, the flank, the rib, the chuck, the plate, the brisket, and the shoulder. These primary cuts fall onto a conveyor belt 44 that operates below the carcass 11. The conveyor belt 44 delivers the primary cuts for further butchering or transport to a wholesale outlet. The additional butchering may be accomplished by butchers or by using another image station and cutting station.

From the cutting station 40, the mounting vehicle 16 proceeds to a cleaning station 50. At the cleaning station, workers remove any fluids or portions of the carcass 11 that remain on the mounting vehicle 16. Alternatively, the high pressure water jets (not shown), which are positioned in relation to the mounting vehicle 16, may be used to clean the mounting vehicle 16. Once cleaned, the mounting vehicle 16 returns to the mounting station 14 to receive another carcass 11.

Although the apparatus 10 relieves butchers from the arduous task of segmenting animal carcasses into large primary cuts, the main benefit of the apparatus 10 lies in its efficient approach to segmenting animal carcasses 11. Therefore, the number of stations 14, 20, 40 and 50 and of mounting vehicles 16 are advantageously selected to maximize efficiency. For instance, assume that the apparatus 10 illustrated in FIG. 1A can segment a carcass in the same time that it takes to scan another carcass. This assumption is fairly accurate since a complex cutting station 40 including four cutting implements 42, as illustrated, can segment a carcass in about one or two minutes. Thus, the apparatus should contain at least four mounting vehicles 16, one imaging station 20 and one cutting station 40. With four mounting vehicles 16, respective carcasses can be loaded, scanned, and cut simultaneously.

Figure 1B:
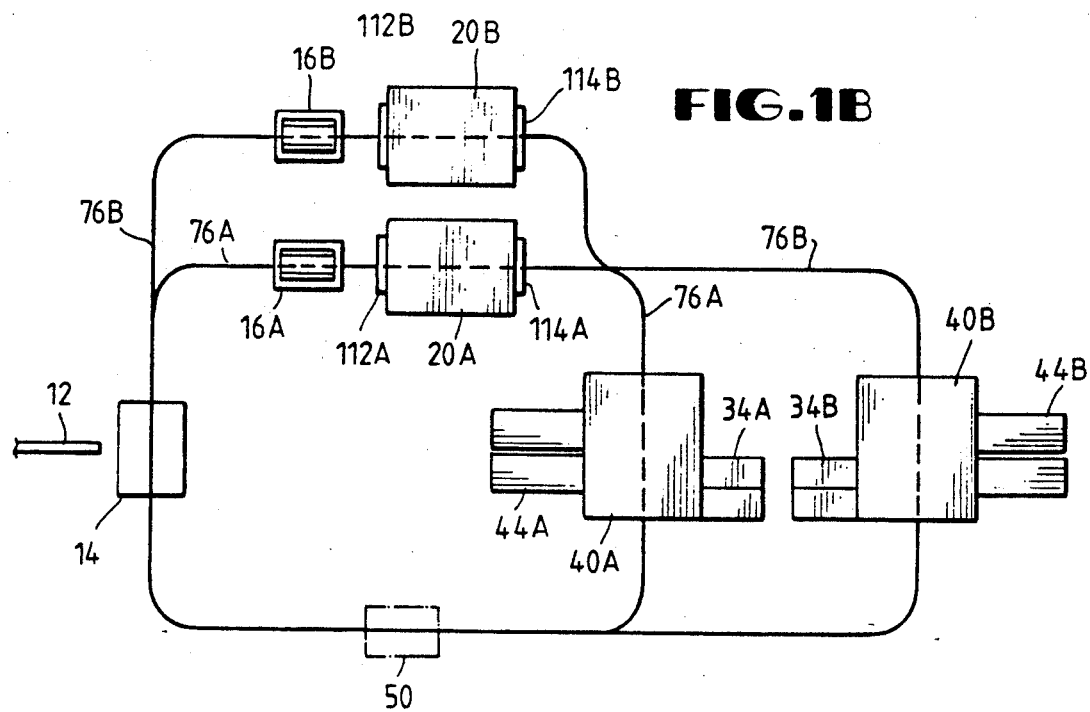
FIG. 1B is a top view of another embodiment of the apparatus illustrated in FIG. 1A.

However, if the cutting station 40 takes twice as long to segment a carcass as the imaging station 20 takes to scan a carcass, then the cutting station 40 decreases the efficiency of the entire apparatus. To solve this problem, as shown in FIG. 1B, a second cutting station 40B is positioned in parallel with the first cutting station 40A to receive every other carcass 11 that leaves the imaging station 20. Similarly, if the imaging station 20 takes twice as long to scan a carcass 11 as the cutting station 40 takes to segment a carcass, then an additional imaging station 20B is incorporated into the apparatus 10 in parallel with the first imaging station 20A. The single cutting station 40A then receives each carcass 11 from the two imaging stations 20A and 20B. In each of these situations, at least five mounting vehicles are used so that each station is fully utilized.

In addition to customizing each apparatus 10 so that it works efficiently, to optimize the overall butchering process, from killing the animal to shipping packaged retail cuts, several apparatuses 10 may be required or a single apparatus 10 may require further customizing. For instance, if the laborers can prepare 100 carcasses per hour to be segmented by an apparatus 10, and the apparatus 10 can only segment twenty carcasses per hour, then using five different apparatuses 10 would optimize overall efficiency.

Referring now to the remaining drawings, the components of the apparatus 10 will be described in greater detail. FIGS. 2A, 2B, 3A and 3B illustrate two embodiments of the mounting vehicle 16 in greater detail. As illustrated FIGS. 2A and 3A, the mounting vehicle 16 includes an upper saddle portion 52 and a lower base portion 54. The saddle portion 52 is shaped somewhat like a pommel horse in that it is rectangular or oblong in shape. In the mounting station 14, the cavity of the eviscerated carcass 11 is placed over the saddle portion 52, so that the mounting vehicle 16 transports the carcass 11 in a fairly natural position with its spine roughly parallel to the ground and its legs hanging downwardly.

To hold the carcass 11 in place during transport and during subsequent cutting operations, a plurality of retractable hooks 56 reside within the saddle portion 52. After the carcass has been placed on the saddle portion 52, the hooks 56 are actuated from their retracted position to an extended position so that the hooks 56 grip or pierce into the cavity walls of the carcass 11. Alternatively, the hooks 56 may be angled upwardly so that, when extended, the hooks on one side of the mounting vehicle 16 converge toward the hooks on the other side of the mounting vehicle 16. In this configuration, the hooks 56 grip or surround the spine of the carcass 11 to hold it on the mounting vehicle. The outer ends of the hooks 56 may be flat, rounded, or pointed, depending on which configuration best holds the carcass to be segmented.

A variety of mechanisms may be used to actuate the retractable hooks 56. As illustrated in FIG. 2B, the hooks 56 are preferably hydraulically or pneumatically actuated. Fluid enters and exits the cylinder 58 through a coupling 60 to respectively extend and retract the piston 62 which serves as the hook 56. Preferably, the mounting vehicle 16 carries a hydraulic or pneumatic source 64 for supplying fluid to the hooks 56.

Alternatively, adjacent hooks 56 can be connected to respective racks which are moved back and forth by the rotation of a pinion gear (not shown). The pinion gear can be rotated manually, mechanically, or electrically. As another example, each retractable hook 56 can be a piston of a solenoid. The piston is spring-biased toward its extended position so that application of an electric current to the stationary winding of the solenoid retracts the piston.

Whatever form the hooks 56 take, they can be activated in any of a variety of ways. Preferably, the hooks 56 are activated and deactivated manually as the operator chooses. A lever 66 associated with the circuit controlling the hooks 56 is provided at the rear of the mounting vehicle 16. Moving the lever 66 in a first direction retracts the hooks 56 and moving the lever 66 in a second direction extends the hooks 56. Alternatively, by using a pressure sensitive switch (not shown), the hooks 56 may be activated by the pressure of the carcass 11 when placed on the saddle portion 52, and deactivated when the pressure of the carcass 11 is removed during the cutting operation. As another alternative, the hooks 56 may be automatically activated in response to the mounting vehicle 16 reaching a particular point in the apparatus 10 before entering the image station 20, and automatically deactivated when reaching another point in the apparatus 10 after exiting the cutting station 40.

The mounting vehicle 16 represents a significant advance over overhead rail conveyors that hold a carcass during cutting operations. The overhead rail conveyors tend to allow the carcass to move or swing in response to the force of the cutting implement. In contrast, the mounting vehicle 16 rigidly secures the main portion of the carcass during the cutting operations, so that the force of the cutting implements will not move the carcass by any appreciable amount. Thus, cutting implements segment the carcass more accurately when the carcass is held on the mounting vehicle 16.

The mounting vehicle 16 can transport a carcass 11 between the various stations in any one of a variety of ways. Preferably, each mounting vehicle 16 is self-propelled. As illustrated in FIG. 2A, the base portion 54 of the mounting vehicle 16 houses a motor 70. The motor 70 drives a rear axle 72 via a chain or belt 74. The motor 70 also supplies power to the fluid supply 64 if required, e.g., if the fluid supply 64 is a hydraulic pump. Preferably, the mounting vehicle 16 follows a preselected path 76. For instance, the path 76 may be a wire imbedded into the floor of the slaughterhouse, the path 76 may be a slot in the floor of the slaughterhouse, or, for a more complex self-propelled system, the path 76 may be a programmed path. Regardless of which type of self-propelled system is selected, the base portion 54 most likely carries motor and/or guidance control circuitry 78. The circuitry 78 automatically controls the motor 70 in response to signals delivered to the circuitry from sensors (not shown) in the path 76 or from a central computer control, such as the computer 34. In addition, the base portion 54 preferably covers the drive and control components of the mounting vehicle 16 to protect them from the working environment in the apparatus 10.

The advantages of using self-propelled mounting vehicles 16 are numerous. First, self-propelled vehicles, particularly those utilizing self-guided or wire-guided systems, permit a flexible layout of the stations of the apparatus 10. Second, the layout of the stations can be changed or additional station can be added easily. Third, each vehicle 16 may be independently controlled to further enhance the efficiency of the apparatus 10.

Even though self-propelled mounting vehicles offer many advantages, they are typically rather expensive. Therefore, other types of propulsion systems may be used to move the mounting vehicles 16 between the various stations. One such system is illustrated in FIGS. 3A and 3B. The base portion 54 of the mounting vehicle 16 rides atop a rail system 80 so that the mounting vehicle 16 may be transported to the various work stations of the apparatus 10. As illustrated by the cross-sectional view of FIG. 3B, the base portion 54 includes two downwardly-extending legs 82 and 84 which envelope opposing rails 86 and 88 of the rail system 80. A bottom surface 90 of the base portion 54 rides atop the opposed rails 86 and 88, while the legs 82 and 84 tend to stabilize the mounting vehicle 16 as it travels along the rails 86 and 88.

In order for the mounting vehicle 16 to move, it is connected to a drive mechanism 92. As illustrated, the drive mechanism 92 is a chain that moves longitudinally between the rails 86 and 88. A extendable and retractable peg 94 is disposed in a slot 96 formed in the bottom surface 90. The peg 94 may be, for example, the piston 95 of a solenoid, a hydraulic cylinder, or a pneumatic cylinder 97. When extended, the peg 94 slides through an aperture in an upwardly extending flange 9 that is attached to the drive mechanism 92. Once coupled to the drive mechanism 92, movement of the drive mechanism 92 produces movement of the mounting vehicle 16. Preferably, either the mounting vehicle 16 or the rail system 80 includes position encoding devices (not shown) that provides information regarding the location of the carcass 11 in relation to the various stations of the apparatus 10.

It should be noted that the materials used to construct the mounting vehicle 16 are advantageously selected to facilitate x-ray imaging. The mounting vehicle 16 is preferably constructed from plastic or composite material that permits x-ray radiation to pass through, i.e., a material that is transparent or translucent to the x-ray radiation, instead of from metal which blocks a large portion of the radiation. If the mounting vehicle 16 was formed of metal or some other material that is opaque to the x-ray radiation, then the x-ray scanners could not produce an adequate interior image of the carcass due to the interference from the mounting vehicle 16. Conversely, if the mounting vehicle 16 is primarily formed of an x-ray translucent or transparent material, then most of the interior of the carcass 11 can be accurately imaged by the x-ray scanners. A certain amount of metal in the mounting vehicle 16 may not be objectionable. In fact, if metal solenoids or cylinders are used as hooks 56, during subsequent image processing, the locations of the hooks 56, or of other strategically-placed metal objects, can be used as reference points during image processing.

Once the carcass 11 has been mounted on the mounting vehicle 16 in the mounting station 14, the mounting vehicle 16 moves the carcass 11 to the imaging station 20. In the imaging station 20, internal and external parameters of the carcass 11 are determined, and these parameters are later used to segment the carcass 11. The external parameters may include: the dimensions of the carcass, the position of the limbs, and contours of the external musculature of the carcass. The interior parameters may include: the position, density, and size of the bones; the width and location of the fat seam; the location of certain joints; contours of the internal musculature of the carcass; moisture content; location of abscesses; and approximation of red meat cut out or yield.

The preferred embodiment of the imaging station 20 is illustrated in FIG. 1A. As previously mentioned, the two television cameras 22 and 24 image an exterior portion of the carcass when the carcass is in the imaging station 40. Two-camera three-dimensional industrial machine vision systems are well known in the art, and any one of a variety of these systems can be used in the imaging station 40. Additionally, two x-ray tubes 26 and 28 having opposed image intensifiers 30 and 32 are used to produce three-dimensional images of an internal portion of the carcass. While not being generally known or used in industry, dual x-ray tubes and intensifiers are used in the medical sciences to produce three-dimensional images of a patient's internal organs.

Since x-ray scanners are used during imaging, the imaging station 20 is preferably designed to prevent radiation from exiting the imaging station 20. Lead preferably lines the walls 110 of the imaging station 20, as well as an entrance door 112 and an exit door 114. The doors 112 and 114 open to allow a mounting vehicle 16 to enter or exit, and the doors 112 and 114 close during imaging. Preferably, each of the doors 112 and 114 includes a flexible door member, a roller extending across the entire width of the door, and an electric motor coupled to the roller and adapted to rotate the roller and thereby wind the flexible door member onto or off of the roller. The doors 112 and 114 may be open and closed at the discretion of an operator or automatically in response to the carcass 11 reaching the desired location within the imaging station 20.

Before imaging begins, the mounting vehicle 16 or the carcass thereon is positioned in a known location within the imaging station 20. For instance, a detector, such as a photodiode, is positioned within the imaging station 20 to deliver a control signal in response to the carcass 11 or the mounting vehicle 16 reaching a predetermined location. This control signal causes the drive mechanism of the mounting vehicle 16 to stop the mounting vehicle 16 in the predetermined location. As previously alluded to, this control signal may also be used to trigger closure of the doors 112 and 114. Alternatively, if the mounting vehicle 16 is automatically guided by a computer, the coordinates of the predetermined location can be programmed so that the mounting vehicle 16 stops in the predetermined location.

Once in position, the interior and exterior portions of the carcass are scanned. Since the signals delivered by the television cameras 22 and 24 and by the x-ray tubes 26 and 28 do not interfere with one another, the interior and exterior of the carcass can be scanned simultaneously. Typically, neither the television cameras 22 and 24 nor the x-ray tubes 26 and 28 will be capable of scanning the entire carcass without some relative movement between the carcass 11 and the respective scanners. Therefore, the carcass 11 can be moved by the mounting vehicle 16 at a controlled rate past the scanners. In this instance, the television cameras 22 and 24 and the x-ray tubes 26 and 28 with their opposed image intensifiers 30 and 32 should be positioned t rapidly scan the complete carcass 11 as the carcass 11 moves past.

Alternatively, though not preferable due to the increased expense, the mounting vehicle 16 can hold the carcass 11 stationary while the television cameras 22 and 24 and the x-ray tubes 26 and 28 with their associated image intensifiers 30 and 32 move along the length of the carcass 11. In the medical practice, each x-ray tube and its associated image intensifier are mounted onto a respective positionable U-shaped member so that an operator can accurately position each of the tubes and intensifiers about a patient. Having moveable x-ray tubes and intensifiers is preferable in the medical practice because moving a patient during a surgical procedure is generally not recommended. However, the present application creates no such concerns. Therefore, to avoid the expense and considerable clutter associated with moving the scanners, it is preferable to use stationary scanners and to move the carcass 11 past the scanners.

Strategic placement of the x-ray tubes 26 and 28 and their associated image intensifiers 30 and 32 facilitates their production of the interior images. For instance, if the lower portion of the mounting vehicle 16 contains a motor or other metal parts that ca interfere with the interior image, each x-ray tube 26 and 28 and its respective image intensifier 30 and 32 should be arranged so that the motor does not intrude into the image field. Therefore, the x-ray scanners are preferably placed in an x-shaped configuration where each x-ray tube 26 and 28 is mounted on either side of the carcass 11 as it passes through the mounting station 40. Depending upon the height of the mounting vehicle 16 and the length of the legs of the carcass 11, the legs may hang on either side of the drive mechanism of the mounting vehicle 16, and, thus, preclude imaging the total carcass without interference. However, since only the body of the carcass 11, not the lower portions of the legs, is typically segmented, imaging of the entire carcass is not necessary.

Figure 10:
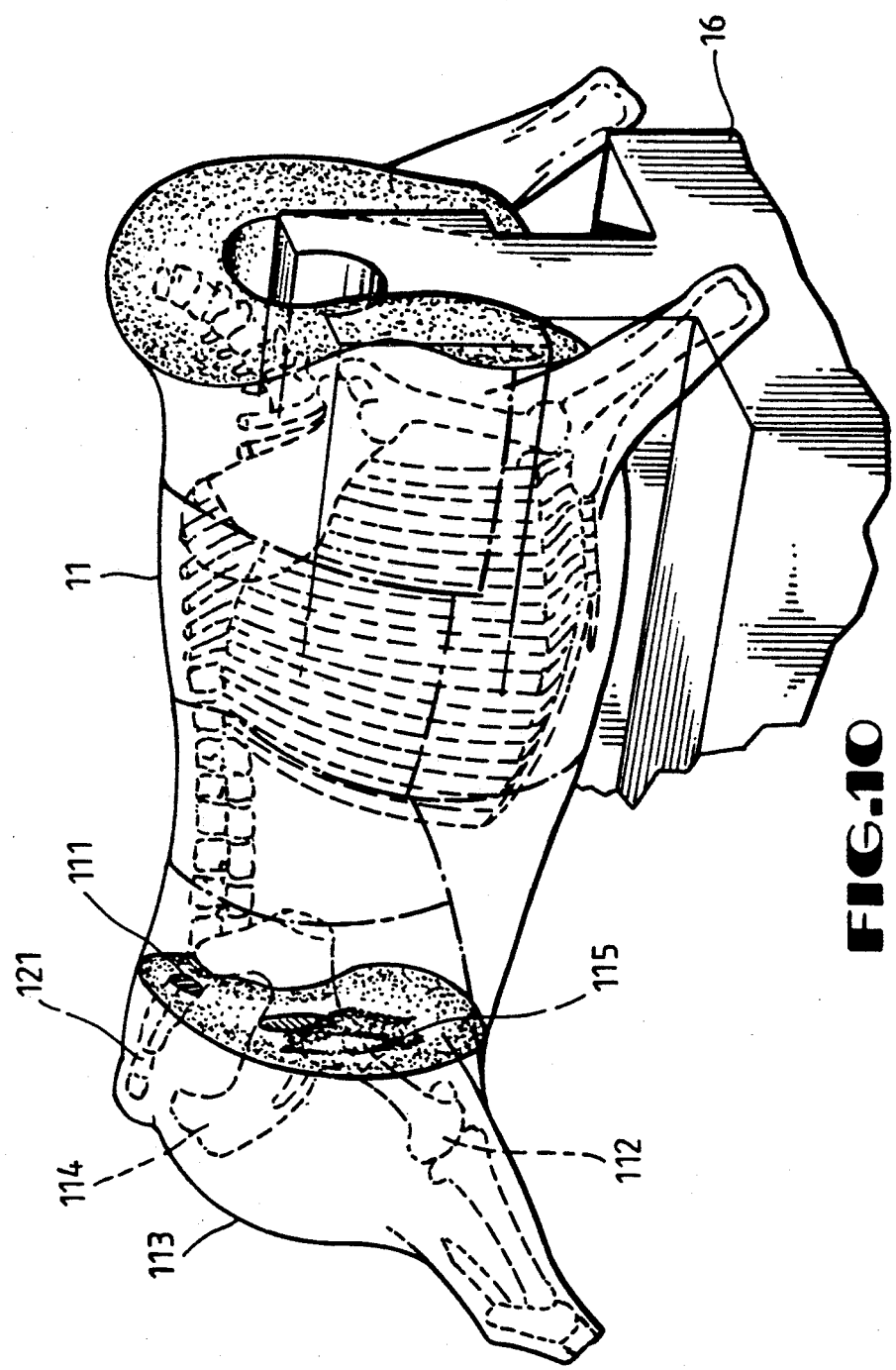
FIG. 10 illustrates a three-dimensional view showing interior and exterior portions of the carcass.

The image signals from the television and x-ray scanners are delivered to the computer 34 for processing. Since the processing of image signals from television and x-ray scanners is well known, the processing performed by the computer 34 will not be described in detail herein. Preferably, the WHIP software package available from G.W. Hannaway and Associates of Boulder, Colo. is used to process the image signals from the television scanners, and the EXPERT and/or I.X.L software packages available from Intelligence Ware of Los Angeles, Calif. are used to process the internal image signals from the x-ray scanners. Briefly, the images from the television and x-ray scanners are digitized so that the computer 34 can process the digitized image signals. The computer 34 forms a real time, three-dimensional volumetric image, as illustrated in FIG. 10. The image has spatial and density data that completely describes the carcass in the virtual memory of the computer 34. Volumetric computer image software packages, such as those available from Hannaway or from Dynamic Graphics of Alameda, Calif., can be used to combine the external and internal image signals to create the three-dimensional image.

To segment the carcass 11 as an experienced butcher would segment the carcass, the computer 34 preferably utilizes an expert system. In essence, by interpreting the stored image, the expert system produces three-dimensional cutting paths through the carcass 11. The cutting paths are converted into commands for the cutting implements 42. This conversion may be accomplished by the computer 34 or by a control associated with the cutting implements 42.

Figure 9:
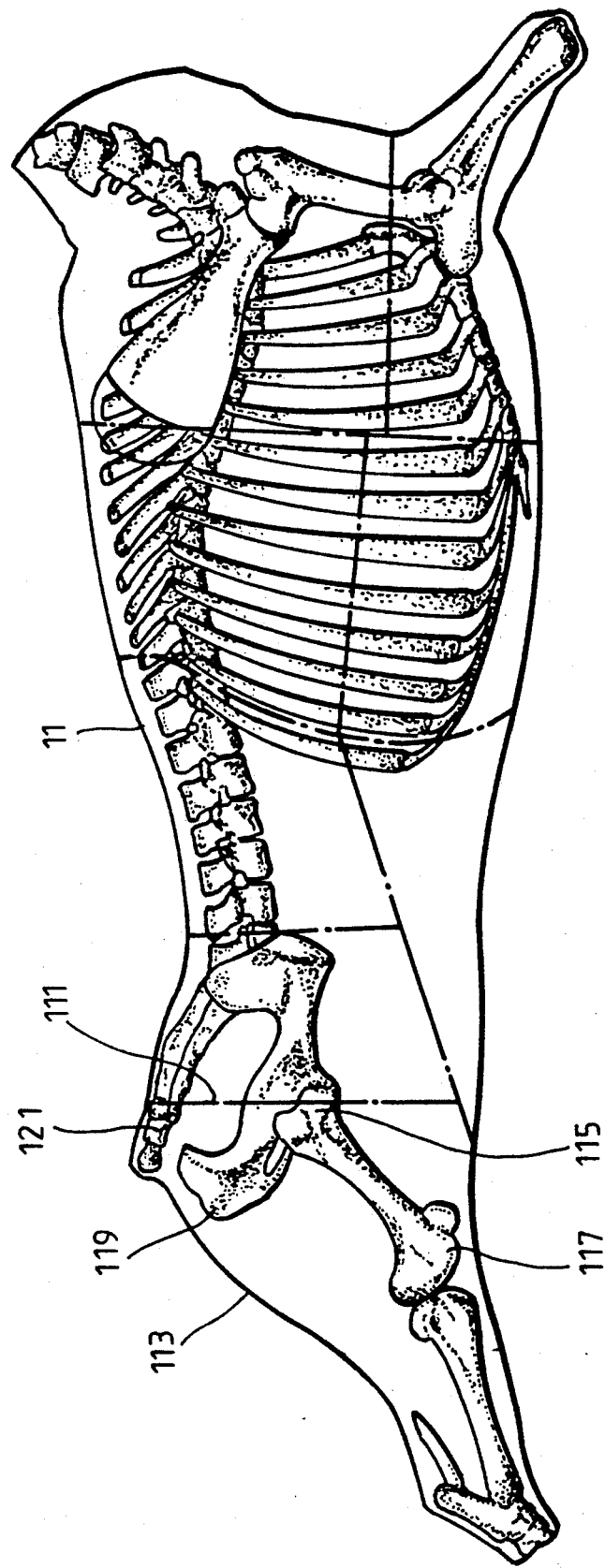
FIG. 9 illustrates a two-dimensional view showing interior and exterior portions of the carcass.
Figure 10A:
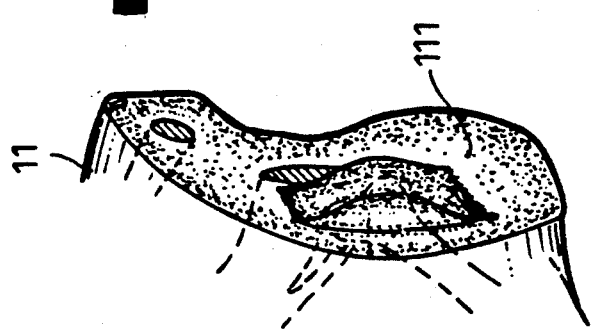
FIG. 10A illustrates a three-dimensional cutting path.

Referring to FIGS. 9, 10 and 10A, to produce the cutting paths, the x-ray scanners are preferably adjusted to produce discernable images of certain bones in the carcass 11. Using these images, the computer 34 determines the positions of these bones. The expert system utilizes this information in conjunction with the exterior images produced by the television scanners, to determine the cutting paths for the various primal cuts.

For instance, to determine the cutting path 111 which segments the rump 113 from the carcass 11, the expert system locates the joint 115 where the femur 117 of the carcass joins the hip 119. The expert system also locates the position of the tailbone 121. Since the stored image is three-dimensional and includes not only interior images but also the exterior contours of the carcass 11, the expert system selects locations on the surface of the carcass 11 that correspond to the rump cut. Once the expert system has located the relevant bones and contours, it produces a three-dimensional cutting path 111 through the carcass 11.

To facilitate better cutting path selection, the carcass 11 may be scanned in a manner to obtain two internal images having different resolutions. For instance, the carcass 11 can be scanned twice by the x-ray scanners. During the first scan, the x-ray scanners are set at a relatively high intensity to produce an image of the bones of the carcass 11. During the second scan, the x-ray scanners are set at a lower intensity to produce an image of the internal musculature of the carcass 11. Alternatively, two sets of x-ray scanners can be used at the same intensity to scan the carcass 11. One scanner is provided with a filter, such as an aluminum filter, so that it produces an image of the internal musculature, while the unfiltered scanner produces an image of the bones of the carcass 11.

Using this information in conjunction with the exterior image produced by the television scanners, the expert system can not only locate the bones and the exterior contours of the carcass 11, but it can also locate at least a portion of the interior contours of the carcass 11. Thus, the cutting path 111 can be carefully produced s that the cutting path 111 essentially follows the internal and external musculature of the leg and rump. This image may also define the fatty tissue of the carcass and its relationship to the muscle tissue. If so, the cutting paths can require the cutting implements to cut the fatty tissue from the carcass during the cutting operation.

Alternatively, ultrasonic scanners or other probes may be used, in combination with one or both of the internal and external vision systems, to obtain information regarding the interior or exterior of the carcass 11. For instance, an ultrasonic scanner can be adapted to contact the carcass and deliver information regarding the interior of the carcass, or it can be adapted to detect signals reflected off of the carcass 11 and deliver information regarding the exterior of the carcass. As another example, a moisture probe could be inserted into the carcass 11 to approximate the density of red meat cut out from the carcass. As yet another example, infra red imaging can be used to detect the location of any abscess in the carcass 11. The expert system would also evaluate this information and alter its cutting paths accordingly to avoid cutting the abscess or to cut out the abscess.

After the carcass has been fully scanned in the imaging station 20, the carcass 11 is transported to the cutting station 40 illustrated in FIG. 1. A camera or detector 124 is positioned within the cutting station 40 for determining the proper location of the carcass 11. As the mounting vehicle 16 moves the carcass 11 into the cutting station 40, the detector 124 determines the proper position of the carcass 11 so that the cutting implements 42A–42D can segment the carcass 11 along the predetermined cutting paths. Most preferably, the detector 124 is a television camera that is positioned similarly to the television camera 22 with respect to the carcass 11. So positioned, the image from the camera 22 can be compared to the image from the camera 124 to determine the proper location for the carcass 11.

As previously mentioned, the cutting station 40 includes a plurality of multi-axis cutting implements 42. Preferably, two cutting implements 42 are positioned on either side of the carcass 11, with one cutting implement 42 of each pair positioned near the rear of the carcass and the other cutting implement 42 of each pair being positioned near the front of the carcass. The two front cutting implements 42A and 42B are mounted on a frame 116 that is slidable along parallel rails 126 and 128 in the direction of the x axis of the Cartesian coordinate system 120. The two rear cutting implements 42C and 42D are similarly mounted on a frame 122 which is also slidable along the rails 126 and 128 in the direction of the x axis. Preferably, the frames 116 and 122 move independently of one another so that all of the cutting implements 42A–42D can cut along independent cutting paths simultaneously.

Referring now to FIGS. 4A, 4B, 5, 6, 7 and 8, the construction and operation of the cutting implements 42 will be described. Since each of the cutting implements 42 are similar to one another, FIG. 4A illustrates an exemplary cutting implement 42A. The frame 116 can move the cutting implement 42 along the rail 126 in the direction of the double-headed arrow 130, i.e., along the x axis. The cutting implement 42 is also mounted to a member 132 that is adapted to move along the z axis in the direction of the double-headed arrow 134. The cutting implement 42 includes a cutting head 136 that is coupled to a multi-axis lever arm 138. The multi-axis arm 138 is slidably coupled to the member 132 by a fitting 140. The fitting 140 is adapted to move along the y axis in the direction of the double-headed arrow 142.

The multi-axis arm 138 is preferably a robotic arm available from ASI Robotics of Jeffersonville, Ind. However, FIG. 4A illustrates an exemplary multi-axis arm with the understanding that a wide variety of multi-axis arms can be used for facilitating the segmenting of the carcass 11. The multi-axis arm 138 includes a first arm 144, one end of which is pivotally attached to the fitting 140 to produce angular movement in the direction of the curved double-headed arrow 146. The other end of the first arm 144 is pivotally attached to one end of a second arm 148 to produce angular motion in the direction of the curved double-headed arrow 150. The other end of the second arm 148 is pivotally attached to one end of a third arm 152 to produce angular motion in the direction of the double-headed arrow 154. The other end of the third arm 152 is pivotally attached to the cutting head 136 to produce angular movement in the direction of the curved double-headed arrow 156.

It can be seen that the multi-axis arm 138 is angularly moveable about five different axes, and its connection to the frame 116 facilitates linear movement along the x, y, and z axes of the Cartesian coordinate system 120. In addition, as illustrated in FIG. 4B, the cutting head 136 may also pivot about an axis 158 in the angular direction of the curved double-headed arrow 160. If so constructed, the arm 138 would allow angular movement of the arm 138 and cutting head 136 in six different axes. Thus, the cutting implements 42 are more than capable of the complex movement required to segment the carcass 11 along virtually any cutting path determined by the expert system.

Figure 5:
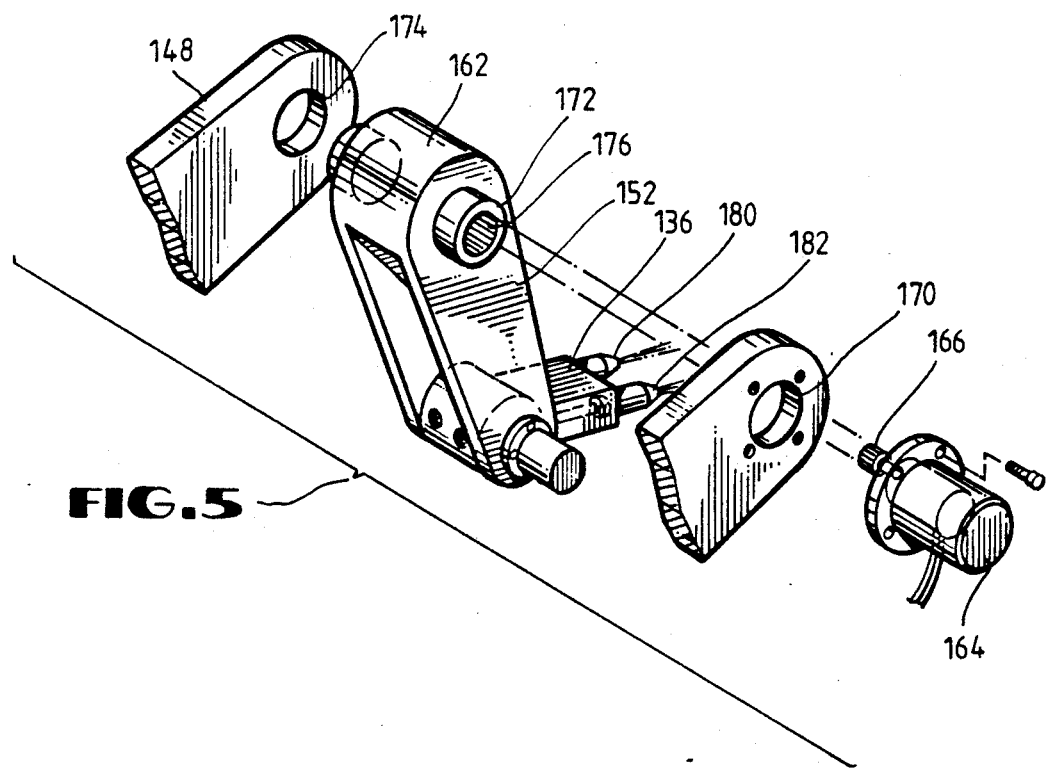
FIG. 5 illustrates an exploded view of a motorized joint of the multi-axis control arm illustrated in FIG. 4A.

Preferably, the cutting implements 42 are driven by closed-loop DC servo systems. As illustrated in FIG. 5, each pivotal joint 162 of the multi-axis arm 138 is pivoted using a motor 164. Since each joint of the arm 138 is substantially identical, the joint 162 illustrated in FIG. 5 is exemplary. The motor 164 drives a toothed gear 166. When the motor 164 is bolted in place on the end of the arm 148, the toothed gear 166 extends through the aperture 170 in the arm 148. The arm 152 has a bushing 172 at one end thereof which is adapted to pivotally engage the apertures 170 and 174 of the arm 148. The bushing includes a toothed bore 176 that engages with the toothed gear 166. Thus, rotation of the toothed gear 166 by the motor 164 produces pivotal movement of the arm 152 with respect to the arm 148. Preferably, the computer 34 delivers the cutting paths to a control associated with the cutting implements 42, and the control converts the cutting paths into the appropriate control signals to drive the respective motors associated with the cutting implements.

As illustrated in FIGS. 4A and 5, the cutting head 136 preferably includes at least two nozzles 180 and 182. The nozzle 180 directs a high pressure water jet to cut muscle and connective tissue of the carcass 11 along the preselected cutting path. The nozzle 182 directs a water jet carrying an abrasive medium to cut deeper tissue and the bones of the carcass 11 along the preselected cutting path. Preferably, each nozzle 180 and 182 directs its respective jet at about 50,000 psi to segment the carcass 11. Hoses 183 and 185 are used to deliver cutting fluid to the respective nozzles 180 and 182.

While a cutting head as simple as the one illustrated in FIGS. 4A and 5 will suffice, FIGS. 11, 12, and 13 illustrate a preferred cutting head 187 for use in segmenting the carcass 11. The following description of the operation of the cutting head 187 will be facilitated by understanding that the cutting head 187 is moving generally in the direction of arrow 189 when segmenting the carcass 11. A first nozzle 191 directs a water jet to cut the first few inches of muscle and connective tissue of the carcass 11 along the preselected cutting path 111.

A pair of second nozzles 193 and 195 are positioned just behind the first nozzle 191 for directing air jets against the carcass 11. The air jets keep the flesh of the carcass 11 separated after the cut is made by the water jet. The second nozzles 193 and 195 are preferably angled away from one another and emit air jets at about 50–70 psi to keep the flesh separated.

A sensor, such as a photodiode 197, is advantageously positioned between the second nozzles 193 and 195. The electrical signal emitted by the photodiode 197 changes state in response to the photodiode 197 detecting a predetermined change in luminosity. Specifically, if the water jet has cut the carcass 11 down to a bone, the photodiode 197 will detect a high degree of luminosity and deliver a corresponding electrical signal to the computer. This signal, coupled with cutting path information that indicates that a bone is indeed in the cutting path, activates an abrasive jet to cut through the bone. A third nozzle 199, positioned behind the photodiode 197, directs the abrasive jet to cut through the bone of the carcass 11 along the predetermined cutting path 111.

While a variety of abrasives could be used in the abrasive jet, preferably crushed eggshells or frozen $CO_2$ pellets are used as the abrasive. These materials will not contaminate the meat as other abrasives, like sand, might. Moreover, the abrasive jet is only used to cut tougher tissue or bone. The cutting path includes information regarding the location of the bones. Thus, when the water jet cuts down to a bone, the abrasive jet is activated to cut through the bone.

Two fourth nozzles 201 and 203 are positioned just behind the third nozzle 199 for directing air jets against the carcass 11. The air jets keep the flesh of the carcass 11 separated after the cut is made by the abrasive jet.

Like the second nozzles 193 and 195, the fourth nozzles 201 and 203 are preferably angled away from one another and emit air jets at about 100–120 psi to keep the flesh separated. A higher air pressure is typically required from the fourth nozzles 201 and 203 than from the second nozzles 193 and 195 since the deeper cut produces more flesh to keep separated.

A sensor 205 is positioned just behind the fourth nozzles 201 and 203. The sensor 205 views the cutting path 111 to determine if more cutting is necessary. The sensor 205 may be another photodiode or a small ultrasonic transceiver. If the sensor 205 delivers an electrical signal indicating that more cutting is necessary, the computer determines whether the first two cuts should have completed the cutting along the cutting path 111. If not, then a fifth nozzle 207 is activated. The fifth nozzle 20 directs a second water jet to cut through the remaining flesh of the carcass 11 along the predetermined cutting path 111.

Since the cutting head 187 preferably uses water jets and an abrasive jet, water and abrasive must be delivered to the cutting head 187 in some manner. In addition, air must be delivered to the cutting head 187. Preferably, hoses 209, 211, and 213 are used to carry water and abrasive to each of the respective nozzles 191, 199, and 207. Hoses 215 and 217 deliver air to the second nozzles 193 and 195 and to the fourth nozzles 201 and 203, respectively. The hoses 209, 211, 213, 215, and 217 are advantageously formed from coiled aluminum tubing which provides flexibility during movement of the cutting head 187. The ends of the hoses 209, 211, 213, 215, and 217 are preferably coupled to the fluid source and the cutting head using a metal-to-metal contact that effectively produces a cold weld. Thus, the hoses do not contain any O-rings that could be deteriorated by the high pressure fluid or abrasive, yet the hoses can be easily replaced.

Figure 6:
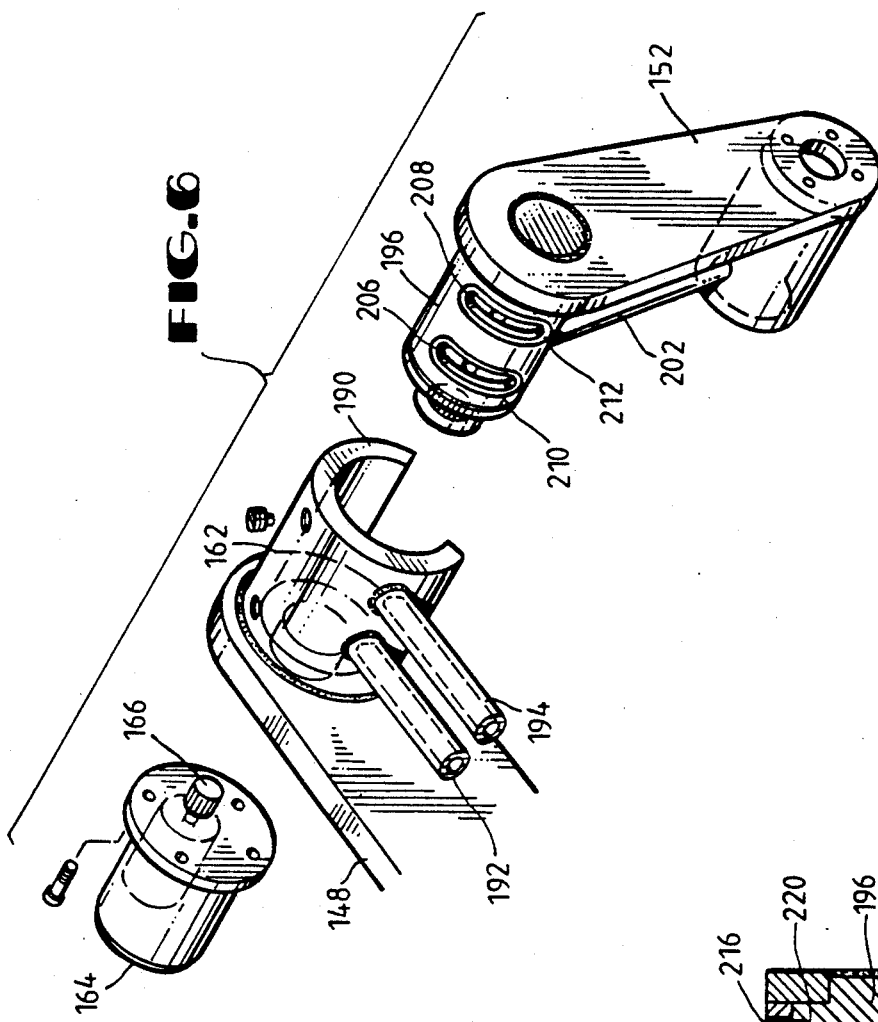
FIG. 6 illustrates an exploded view of another motorized joint of the multi-axis control arm illustrated in FIG. 4A.
Figure 7:
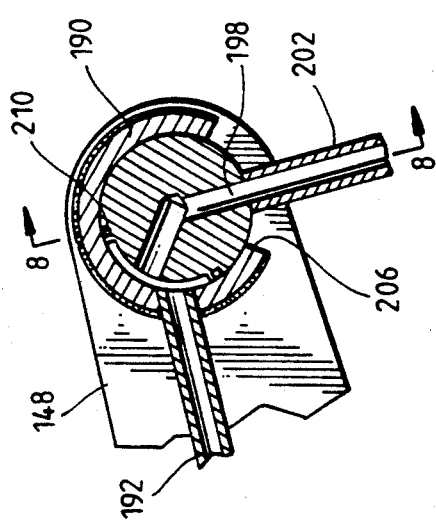
FIG. 7 is a cross-sectional view of an internal port in a portion of an arm and joint illustrated in FIG. 4A.
Figure 8:
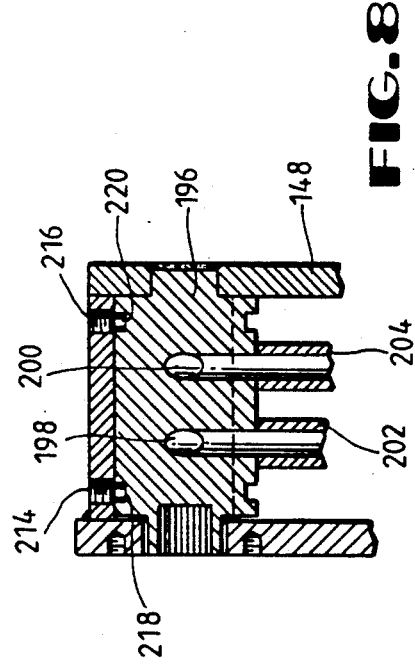
FIG. 8 illustrates a cross-sectional view taken along line 8—8 in FIG. 7.

Alternatively, internal fluid passageways may be provided as illustrated in FIGS. 6, 7 and 8. FIG. 6 illustrates a detailed exploded view of the joint 162, and FIG. 7 and 8 illustrate detailed cross-sections of the assembled joint 162. Since each joint of the arm 138 is similar, only one joint is illustrated and described.

The joint 162 includes an outer sleeve 190 that is coupled to the arm 148. Two fluid passageways 192 and 194 extend from the joint (not shown) at the other end of the arm 148 to the sleeve 190. A substantially solid, complimentary inner sleeve 196 is coupled to the end of the arm 152 that attaches to the arm 148. Preferably, a pair of set screws 214 and 216 are screwed into respective slots 218 and 220 which are formed in the inner sleeve 196 when the joint 162 is assembled.

The inner sleeve 196 has two bores 198 and 200 therethrough that fluidically communicate with the fluid passageways 192 and 194, respectively. Two fluid passageways 202 and 204 are coupled to the bores 198 and 200, respectively, to carry the respective fluids to the other end of the arm 152. The opening 206 in the outer sleeve 190 limits the pivotal movement of the arm 152 because the fluid passageways 202 and 204 would contact the edge of the outer sleeve 190.

To ensure that the fluid passageways 192 and 194 remain in fluidic contact with the fluid passageways 202 and 204, respectively, as the arms 148 and 152 are pivoted relative to one another, a pair of elongated slots 206 and 208 are formed in the inner sleeve 196. Set screw and slot arrangement allows pivotal motion of the arm 148 relative to the arm 152, but does not permit axial movement between the joints which would tend to misalign the fluid passageways 192 and 194 from their respective slots 206 and 208. The slots 206 and 208 are positioned to receive fluid from the fluid passageways 192 and 194 as the arm 152 is pivoted relative to the arm 148. A respective O-ring 210 and 212 encompasses each slot 206 and 208 to prevent fluid from the passageways from leaking out through the joint.

We claim:

1. An apparatus for segmenting an animal carcass, said apparatus comprising:

an imaging station having a vision system, said vision system being arranged to scan at least a portion of said carcass, said vision system producing signals corresponding to a three-dimensional interior and exterior image of said scanned portion of said carcass;

a computer coupled to said vision system, said computer receiving said signals and processing said signals to determine a cutting path for segmenting said carcass; and a cutting station being coupled to said computer, said cutting station having at least one cutting implement being controllably moveable along said cutting path to segment said carcass.

2. The apparatus, as set forth in claim 1, wherein said vision system comprises:

a first television camera and a second television camera, said first television camera being positioned to scan one side of said carcass and said second television camera being positioned to scan another side of said carcass, said television cameras producing first signals corresponding to an exterior portion of said carcass.

3. The apparatus, as set forth in claim 2, wherein said vision system further comprises:

a first x-ray tube and a first image intensifier associated therewith and a second x-ray tube and a second image intensifier associated therewith, said first x-ray tube and first image intensifier being positioned on one side of said carcass and said second x-ray tube and second image intensifier being positioned an another side of said carcass, said first and second image intensifiers producing second signals corresponding to an interior portion of said carcass.

4. The apparatus, as set forth in claim 3, wherein said vision system further comprises:

a signal processor coupled to said television cameras and to said image intensifiers, said signal processor receiving said first and second signals, and said signal processor processing said first and second signals to produce said signals corresponding to an interior and exterior image of said scanned portion of said carcass.

5. The apparatus, as set forth in claim 4, wherein said computer comprises:

an expert system operating in said computer, said expert system receiving said signals corresponding to an interior and exterior image of said scanned portion of said carcass, and said expert system locating pertinent bones and contours from said interior and exterior image to determine said cutting path.

6. The apparatus, as set forth in claim 5, wherein said cutting station comprises:

a first control coupled to said computer, said first control receiving said cutting path and converting said cutting path into control signals, said first control further delivering said control signals to said cutting implement so that said control signals controllably move said cutting implement along said cutting path.

7. The apparatus, as set forth in claim 6, wherein said cutting implement comprises:
an electrically controlled multi-axis arm, said arm being selectively moveable in a plurality of directions in response to said control signals; and
a cutting head being adapted to cut said carcass, said cutting head being mounted on an end of said arm and being moveable therewith such that movement of said arm positions said cutting head along said cutting path.

8. The apparatus, as set forth in claim 7, wherein said cutting head comprises:
a first nozzle being selectively actuatable and being coupled to a first fluid passageway, said first fluid passageway supplying water to said first nozzle; and
a second nozzle being selectively actuatable and being coupled to a second fluid passageway, said second fluid passageway supplying water and abrasive to said second nozzle.

9. The apparatus, as set forth in claim 8, wherein said cutting station further comprises:
a second control coupled to said computer and to said first and second nozzles, said second control receiving said cutting path and selectively actuating said first and second nozzles during cutting.

10. The apparatus, as set forth in claim 1, wherein said portion of said carcass comprises a primary cut.

11. An apparatus for segmenting an animal carcass, said apparatus comprising:
a mounting vehicle being adapted for transporting said carcass;
an imaging station having a first vision system adapted for producing first signals correlative to a three-dimensional image of an exterior portion of said carcass and a second vision system adapted for producing second signals correlative to a three-dimensional image of an interior portion of said carcass in response to said mounting vehicle delivering said carcass to said imaging station;
a computer being coupled to said imaging station, said computer receiving said first and second signals and being programmed to process said first and second signals to determine a cutting path for segmenting said carcass;
a cutting station being coupled to said computer, said cutting station having at least on cutting implement being controllably moveable along said cutting path to segment said carcass in response to said mounting vehicle delivering said carcass to said cutting station.

12. The apparatus, as set forth in claim 11, wherein said mounting vehicle comprises:
an upper saddle portion being dimensioned to accept a carcass which is placed thereon; and
a lower base portion being coupled to a means for providing motive force.

13. The apparatus, as set forth in claim 12, wherein said mounting vehicle further comprises:
a plurality of hooks coupled to said saddle portion, said hooks being extendable and retractable, so that said hooks securely hold said carcass on said saddle portion when extended and permit removal of said carcass from said saddle portion when retracted.

14. The apparatus, as set forth in claim 11, wherein said first vision system comprises:
a first television camera and a second television camera, said first television camera being positioned to scan one side of said carcass and said second television camera being positioned to scan another side of said carcass, said television cameras producing said first signals.

15. The apparatus, as set forth in claim 14, wherein said second vision system comprises:
a first x-ray tube and a first image intensifier associated therewith and a second x-ray tube and a second image intensifier associated therewith, said first x-ray tube and first image intensifier being positioned on one side of said carcass and said second x-ray tube and second image intensifier being positioned an another side of said carcass, said first and second image intensifiers producing said second signals.

16. The apparatus, as set forth in claim 15, wherein said computer comprises:
a signal processor coupled to said television cameras and to said image intensifiers, said signal processor receiving said first and second signals, and said signal processor processing said first and second signals to produce a three-dimensional interior and exterior image of said scanned portion of said carcass.

17. The apparatus, as set forth in claim 16, wherein said computer further comprises:
an expert system operating in said computer, said expert system receiving said three-dimensional interior and exterior image, and said expert system locating pertinent bones and contours from said interior and exterior image to determine said cutting path.

18. The apparatus, as set forth in claim 17, wherein said cutting station comprises:
a first control coupled to said computer, said first control receiving said cutting path and converting said cutting path into control signals, said first control further delivering said control signals to said cutting implement so that said control signals controllably move said cutting implement along said cutting path.

19. The apparatus, as set forth in claim 18, wherein said cutting implement comprises:
an electrically controlled multi-axis arm, said arm being selectively moveable in a plurality of directions in response to said control signals; and
a cutting head being adapted to cut said carcass, said cutting head being mounted on an end of said arm and being moveable therewith such that movement of said arm positions said cutting head along said cutting path.

20. The apparatus, as set forth in claim 19, wherein said cutting head comprises:
a first nozzle being selectively actuatable and being coupled to a first fluid passageway, said first fluid passageway supplying water to said first nozzle; and
a second nozzle being selectively actuatable and being coupled to a second fluid passageway, said second fluid passageway supplying water and abrasive to said second nozzle.

21. The apparatus, as set forth in claim 20, wherein said cutting station further comprises:

a second control coupled to said computer and to said first and second nozzles, said second control receiving said cutting path and selectively actuating said first and second nozzles during cutting.

22. The apparatus, as set forth in claim 11, wherein said carcass comprises a primary cut.

23. The apparatus, as set forth in claim 11, wherein said mounting vehicle comprises a conveyor belt.

24. An apparatus for segmenting an animal carcass, said apparatus comprising:

an imaging station having an exterior vision system and an interior vision system, said exterior vision system producing a three-dimensional image of an exterior portion of said carcass and said interior vision system producing a three-dimensional image of an interior portion of said carcass;

a system coupled to said imaging station, said system receiving said exterior and interior three-dimensional images and processing said exterior and interior three-dimensional images to determine a three-dimensional cutting path for segmenting said carcass;

a cutting station being coupled to said system, said cutting station having at least on cutting implement being controllably moveable along said three-dimensional cutting path; and a mounting vehicle being adapted for securely holding said carcass and transporting said carcass from said imaging station to said cutting station.

25. An apparatus for segmenting an animal carcass, said apparatus comprising:

means for scanning said carcass and delivering signals representing a three-dimensional interior and exterior image of said carcass in response to said scanning;

means for receiving said delivered signals and creating a cutting path in response thereto;

means for controllably segmenting said carcass along said cutting path.

26. The apparatus, as set forth in claim 25, wherein said carcass comprises a primary cut.

27. A method for segmenting an animal carcass, said method comprising the steps of:

scanning said carcass and delivering signals representing a three-dimensional interior and exterior image of said carcass in response to said scanning;

receiving said signals and creating a cutting path in response to said signals;

controllably segmenting said carcass along said cutting path.

28. The method, as set forth in claim 27, wherein said carcass comprises a primary cut.

* * * * *

UNITED STATES PATENT AND TRADEMARK OFFICE
CERTIFICATE OF CORRECTION

PATENT NO. : 5,205,779
DATED : April 27, 1993
INVENTOR(S) : William H. O'Brien, et al It is certified that error appears in the above-indentified patent and that said Letters Patent is hereby corrected as shown below:

Column 2, line 2, after "greater" insert --operator--.

Column 7, line 16, "9" should be --98--.

Column 9, line 7, "ca" should be --can--.

Column 10, line 27, "s" should be --so--.

Column 13, line 17, "20" should be --207--.

Signed and Sealed this

First Day of March, 1994

*Attest:*

BRUCE LEHMAN

*Attesting Officer*     Commissioner of Patents and Trademarks